(12) United States Patent
Yang et al.

(10) Patent No.: US 10,175,936 B2
(45) Date of Patent: Jan. 8, 2019

(54) ELECTRONIC DEVICE CAPABLE OF OBTAINING HEARING DATA ACCORDING TO FACE IMAGE RECOGNITION RESULTS AND METHOD OF OBTAINING HEARING DATA

(71) Applicant: Unlimiter MFA Co., Ltd., Eden Island (SC)

(72) Inventors: Kuo-Ping Yang, Taipei (TW); Neo Bob Chih-Yung Young, Taipei (TW); Ming-Ren Ma, Taipei (TW); Jian-Ying Li, Taipei (TW); Hsiang-Chun Ko, Taipei (TW); Chih-Long Chang, Taipei (TW); Kuan-Li Chao, Taipei (TW); Po-Jui Wu, Taipei (TW)

(73) Assignee: UNLIMITER MFA CO., LTD., Eden Island (SC)

( * ) Notice: Subject to any disclaimer, the term of this patent is extended or adjusted under 35 U.S.C. 154(b) by 0 days.

(21) Appl. No.: 15/424,919

(22) Filed: Feb. 6, 2017

(65) Prior Publication Data

US 2018/0157458 A1 Jun. 7, 2018

(30) Foreign Application Priority Data

Dec. 2, 2016 (TW) .............................. 105218475 U

(51) Int. Cl.
*G06F 3/16* (2006.01)
*G06K 9/00* (2006.01)

(52) U.S. Cl.
CPC ......... *G06F 3/165* (2013.01); *G06K 9/00288* (2013.01); *G06K 2009/00322* (2013.01)

(58) Field of Classification Search
CPC .......................... G06F 3/165; G06K 9/00288
See application file for complete search history.

(56) References Cited

U.S. PATENT DOCUMENTS

| | | | | |
|---|---|---|---|---|
| 2006/0184800 A1* | 8/2006 | Rosenberg | .............. | G06F 21/32 713/186 |
| 2012/0027227 A1* | 2/2012 | Kok | .......... | H03G 3/32 381/107 |
| 2013/0089245 A1* | 4/2013 | Yamazaki | .......... | G06K 9/00228 382/118 |
| 2014/0309549 A1* | 10/2014 | Selig | .................... | H04R 1/1041 600/559 |
| 2014/0313417 A1* | 10/2014 | Tateishi | ........... | H04N 21/42203 348/683 |
| 2015/0145762 A1* | 5/2015 | Shimura | ................. | G06F 3/017 345/156 |
| 2016/0050507 A1* | 2/2016 | Moore | .................... | A61B 5/123 381/57 |
| 2018/0027162 A1* | 1/2018 | Tome | .................... | H04N 5/232 |

\* cited by examiner

*Primary Examiner* — Edward Park
(74) *Attorney, Agent, or Firm* — Bacon & Thomas, PLLC

(57) ABSTRACT

An electronic device includes an image capture module and a processing unit. The image capture module is used for capturing a user's face image. The processing unit includes an image analysis module and an inquiry module. The image analysis module is signally connected to the image capture module for analyzing the face image and obtaining age data according to a face recognition result. The inquiry module is signally connected to the image analysis module for obtaining a user's hearing data according to the age data, wherein the hearing data is the minimum volume data audible to the user for different frequencies of sound.

6 Claims, 4 Drawing Sheets

| Face Recognition Result | Gender Data | Age Data | Hearing Data |
|---|---|---|---|
| 0001 | Male | 0~40 | 1010101010101010 |
| 0010 | Female | 0~40 | 1010101010101010 |
| 0011 | Male | 41~50 | 1010101020203030 |
| 0100 | Female | 41~50 | 1010101010102020 |
| 0101 | Male | 51~60 | 1010101020303040 |
| 0110 | Female | 51~60 | 1010101010102030 |
| 0111 | Male | 61~70 | 1010101020304040 |
| 1000 | Female | 61~70 | 1010101010202030 |
| 1001 | Male | 71~80 | 1010202040506060 |
| 1010 | Female | 71~80 | 1010101010203040 |
| 1011 | Male | 81~90 | 1010202040507070 |
| 1100 | Female | 81~90 | 1010101020303040 |
| 1101 | Male | 91~100 | 1010203050607070 |
| 1110 | Female | 91~100 | 1010102030304050 |

FIG.3

ELECTRONIC DEVICE CAPABLE OF OBTAINING HEARING DATA ACCORDING TO FACE IMAGE RECOGNITION RESULTS AND METHOD OF OBTAINING HEARING DATA

BACKGROUND OF THE INVENTION

1. Field of the Invention

The present invention relates to an electronic device, particularly to an electronic device capable of obtaining hearing data according to face image recognition results.

2. Description of the Related Art

Due to the constant aging of society, more and more attention has been paid to the problems of the elderly. One such problem is the progressive decline in a person's hearing ability as a person ages. Thus, hearing aids are commonly used to help the elderly to hear. When using hearing aids, users often need to adjust the frequency of the output sound according to their own needs; for example, older people often find high-frequency sounds more difficult to hear and must adjust their hearing aids accordingly. However, the users often cannot quickly adjust the output sound to their ideal frequencies.

Therefore, it is necessary to conceive a method for quickly obtaining hearing data so that an electronic device having a sound output function, such as a hearing aid, can adjust the sound output in accordance with the hearing data.

SUMMARY OF THE INVENTION

It is a major objective of the present invention to provide an electronic device capable of obtaining hearing data according to face image recognition results.

To achieve the above objective, the electronic device of the present invention includes an image capture module and a processing unit. The image capture module is used for capturing a user's face image. The processing unit includes an image analysis module and an inquiry module. The image analysis module is signally connected to the image capture module and used for analyzing the face image and obtaining an age data according to a face recognition result. The inquiry module is signally connected to the image analysis module and used for obtaining the user's hearing data according to the age data, wherein the hearing data is the minimum volume data audible to the user for different frequencies of sound.

According to an embodiment of the present invention, the electronic device of the present invention further includes memory, and the processing unit further includes a control module, which is signally connected to the inquiry module. The control module is used for saving hearing data in the memory.

According to an embodiment of the present invention, the electronic device of the present invention is connected to a cloud storage space. The processing unit further includes a control module, which is signally connected to the inquiry module. The control module is used for uploading the hearing data to the cloud storage space.

According to an embodiment of the present invention, the image analysis module is further used for obtaining a gender data. The inquiry module is used for obtaining gender data and age data according to the hearing data.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 3 shows the corresponding relationships between face recognition results and gender data, age data, and hearing data.

DETAILED DESCRIPTION OF THE PREFERRED EMBODIMENT

Figure 1:
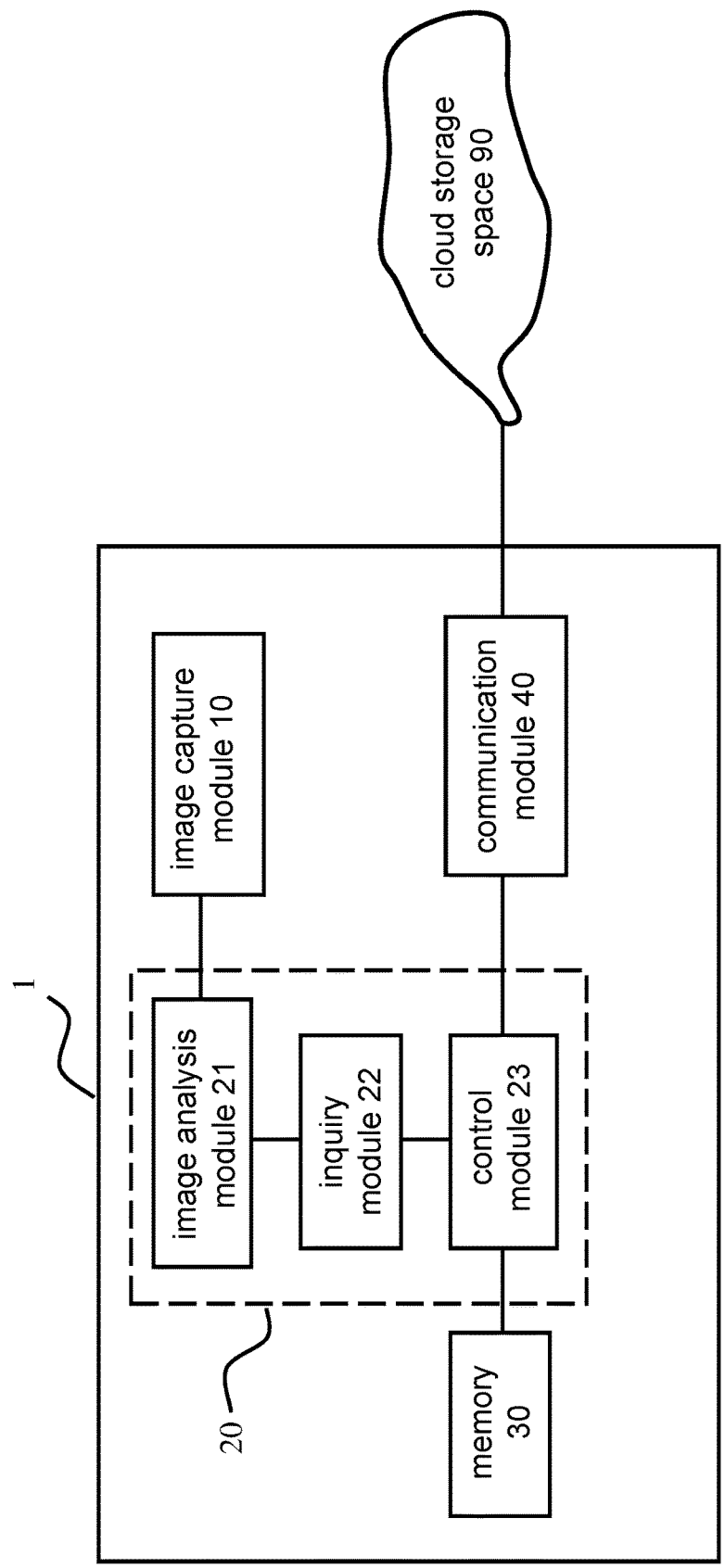
FIG. 1 is an architecture diagram of an electronic device of the present invention.
Figure 2:
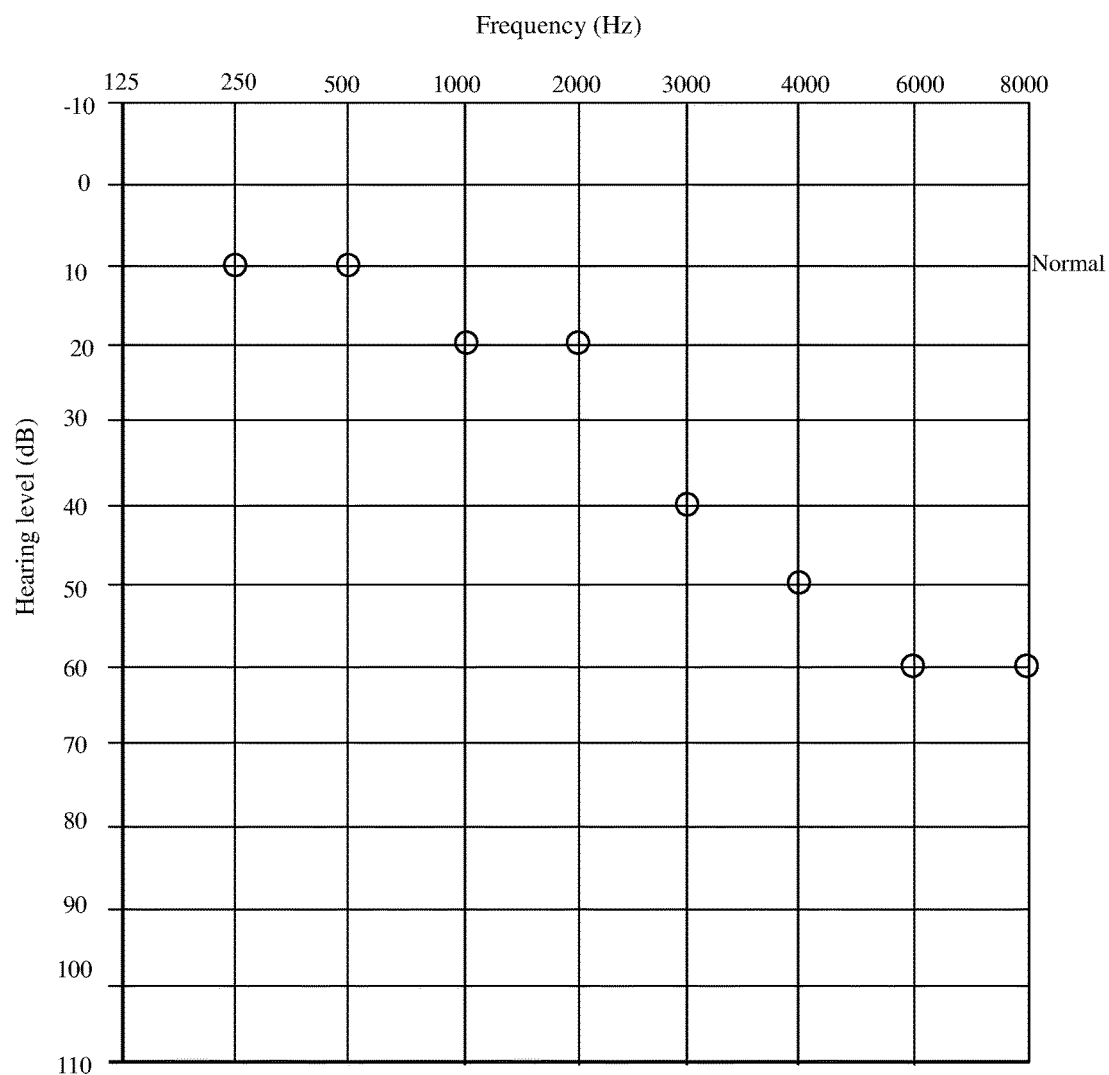
FIG. 2 is a graph showing hearing data.

Hereafter, please refer to FIG. 1 to FIG. 3, wherein FIG. 1 is an architecture diagram of an electronic device in the present invention; FIG. 2 shows a hearing data graph; FIG. 3 shows the corresponding relationships between face recognition results and gender data, age data and hearing data.

As shown in FIG. 1, in an embodiment of the present invention, the electronic device 1 of the present invention includes an image capture module 10, a processing unit 20, a memory 30 and a communication module 40. Specifically, the electronic device 1 can be connected to a cloud storage space 90 through a communication module 40, e.g., a wireless LAN card. In a specific embodiment of the present invention, the electronic device 1 is a smart phone, but the present invention is not limited thereto.

In an embodiment of the present invention, the image capture module 10, such as a camera, is used for capturing a user's face image.

In an embodiment of the present invention, the processing unit 20 includes an image analysis module 21, an inquiry module 22 and a control module 23. It should be noted that the above respective modules may not only be configured as hardware devices, software programs, firmware, or combinations thereof, but configured by circuit loop or other suitable types. Also, each of the modules can be configured individually or in combination. Additionally, the preferred embodiment of the present invention described here is only illustrative. To avoid redundancy, not all the possible combinations of changes are documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules.

In an embodiment of the present invention, the image analysis module 21, e.g., the How-Old.net API (Application Programming Interface) launched by Microsoft Corporation, is signally connected to the image capture module 10. The image analysis module 21 is used for analyzing the face image captured by the image capture module 10 and obtaining gender data and age data according to a face recognition result. In specific implementations, the memory 30 in the electronic device 1 can save the corresponding relationship diagram as shown in FIG. 3; when a face recognition result is generated by the image analysis module 21 after a user's face image is analyzed, the corresponding gender data and age data can be obtained by looking up data in a table. For example, assuming that the image analysis module 21 generates a face recognition result of "1001", the corresponding gender data is "male" and the age data is "71 to 80 (years old)".

In an embodiment of the present invention, the inquiry module 22 is signally connected to the image analysis module 21. The inquiry module 22 is used for obtaining the user's hearing data according to the gender data and age data obtained by the image analysis module 21, wherein the hearing data is the minimum volume data audible to the user for different frequencies of sound. In the example above, for example, based on the gender data "M" and age data "71 to 80 (years old)", the hearing data acquired is "1010202040506060", represented in the graph as shown in FIG. 2. The graph in FIG. 2 shows the user's minimum audible volume as 10 dB for sounds at 250 and 500 Hz; 20 dB for sounds at 1,000 and 2,000 Hz; 40 dB for sounds at 3000 Hz; 50 dB for sounds at 4,000 Hz; and 60 dB for sounds at 6,000 and 8,000 Hz.

In an embodiment of the present invention, the control module 23 is signally connected to the inquiry module 22. The control module 23 is used for saving the hearing data acquired by the inquiry module 22 in the memory 30, and for uploading the hearing data to the cloud storage space 90. In this way, when another electronic device (e.g., a hearing aid) that can output sound is used, the stored hearing data can be retrieved by connecting it to the cloud storage space 90 so that the electronic device can quickly adjust the frequency of the output sound. In other words, after the user's hearing data is obtained, the data can be used for adjusting the output sound frequency of the user's other electronic device, or for adjusting the setting of an equalizer of the electronic device. For the method of using hearing data to adjust the equalizer, please refer to the content of R.O.C Patent No. M519370.

Figure 4:
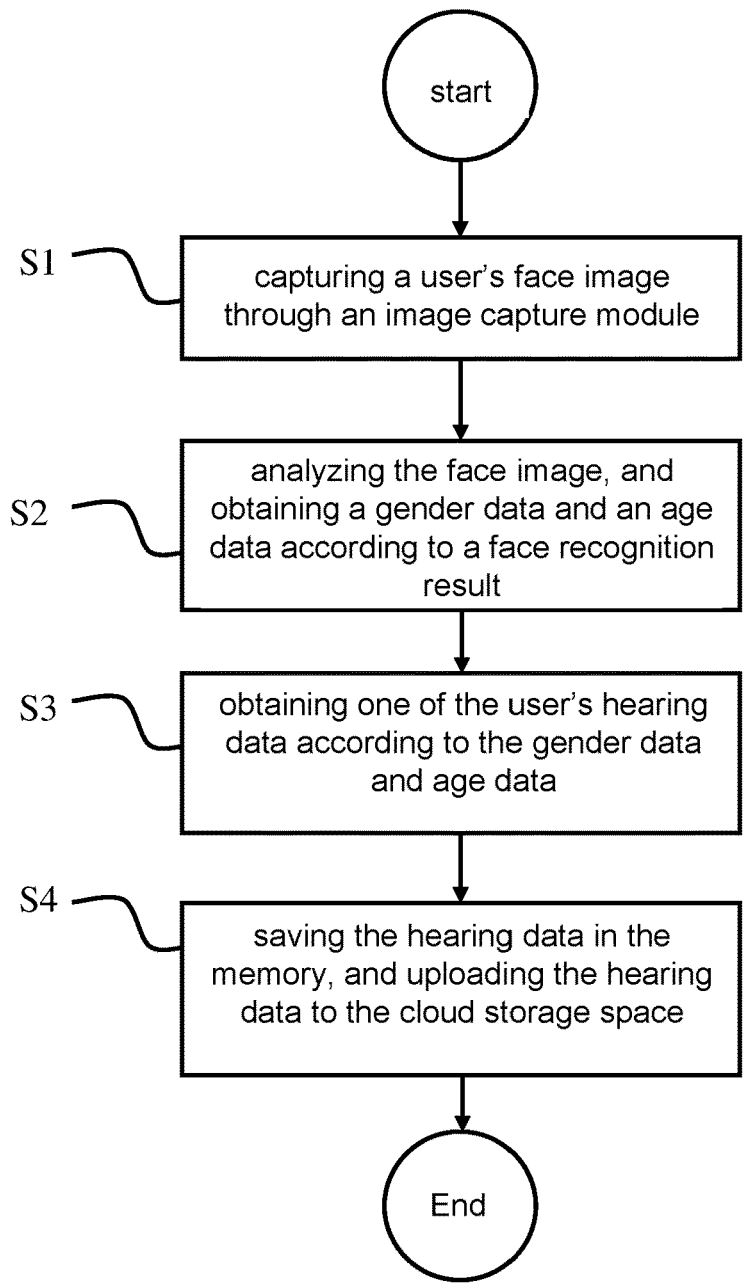
FIG. 4 is a flowchart showing steps of obtaining hearing data according to a method.

Finally, please refer to FIG. 1 to FIG. 4, wherein FIG. 4 is a flowchart showing the steps of obtaining a hearing data according to a method. Hereafter, the steps shown in FIG. 4 will be described sequentially with reference to FIG. 1 to FIG. 3. However, it should be noted that although the electronic device 1 mentioned above is used as an example to describe how the hearing data is obtained, the method of obtaining hearing data is not limited to using the network electronic device 1 as shown in FIG. 1.

First, in step S1: capturing a user's face image through an image capture module.

The method of obtaining hearing data disclosed in the present invention is based on the face image recognition results. Therefore, the first step of the method is to capture the image of the user through the image capture module 10 of the electronic device 1. Specifically, the user operates the electronic device 1 to control the image capture module 10 to acquire the user's own image.

Then, in step S2: analyzing the face image, and obtaining a gender data and an age data according to a face recognition result.

After the image capture module 10 obtains the user's face image, the image analysis module 21 then analyzes the user's face image and acquires a gender data and an age data according to face recognition results.

In step S3: obtaining a hearing data of the user according to the gender data and age data.

After the image analysis module 21 obtains the gender data and age data, the inquiry module 22 can acquire a user's hearing data according to the gender data and age data, wherein the hearing data is the minimum volume data audible to the user for different frequencies of sound.

Finally, in step S4: saving the hearing data in the memory, and uploading the hearing data to the cloud storage space.

After the inquiry module 22 obtains the user's hearing data, the control module 23 saves the hearing data in the memory 30 and uploads the hearing data to the cloud storage space 90 for storage.

As described above, the objective, means, and efficiency of the present invention are all different from conventional characteristics in the prior art. It will be appreciated if the committee can review and grant a patent to benefit society. However, it should be noted that the described embodiments are only for illustrative and exemplary purposes, and that various changes and modifications may be made to the described embodiments without departing from the scope of the invention as disposed by the appended claims.

What is claimed is:

1. An electronic device, comprising:
    an image capture module, which is used for capturing a user's face image;
    a processing unit, comprising:
    an image analysis module, which is signally connected to the image capture module, for analyzing the face image and obtaining an age data and a gender data according to a face recognition result; and
    an inquiry module, which is signally connected to the image analysis module, for obtaining a user's hearing data according to the age data and the gender data,
    wherein the hearing data is data on minimum volumes audible to a person of the user's age and gender for different frequencies of sound.

2. The electronic device as claimed in claim 1, further comprising a memory, the processing unit further comprising a control module, which is signally connected to the inquiry module, for saving the hearing data in the memory.

3. The electronic device as claimed in claim 1, wherein the electronic device is connected to a cloud storage space, and the processing unit further comprises a control module which is signally connected to the inquiry module for uploading the hearing data to the cloud storage space to be stored.

4. A method of obtaining hearing data, applied to an electronic device which comprises an image capture module, the method comprising the following steps of:
    capturing a user's face image through the image capture module;
    analyzing the face image and obtaining an age data and a gender data according to a face recognition result; and
    obtaining a user's hearing data according to the age data and the gender data,
    wherein the hearing data is data on minimum volumes audible to a person of the user's age and gender for different frequencies of sound.

5. The method as claimed in claim 4, wherein the electronic device further comprises a memory, the method further comprising the following step of:
    saving the hearing data in the memory.

6. The method as claimed in claim 4, wherein the electronic device is connected to a cloud storage space, the method further comprising the following step of:
    uploading the hearing data to the cloud storage space to be stored.

* * * * *